(No Model.)
J. T. SHOUP, Jr.
BAND CUTTER.
No. 284,765. Patented Sept. 11, 1883.
Fig. 1.
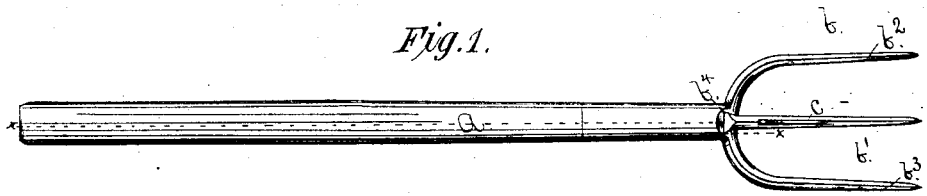
Fig. 2.
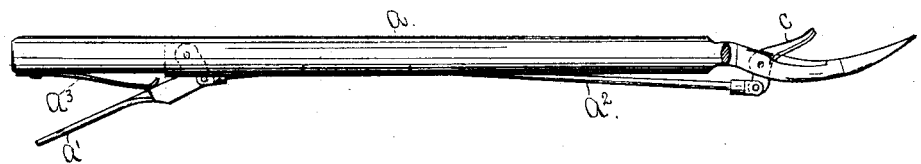
Fig. 3.
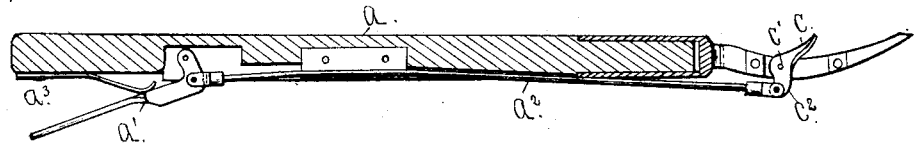
Fig. 4.
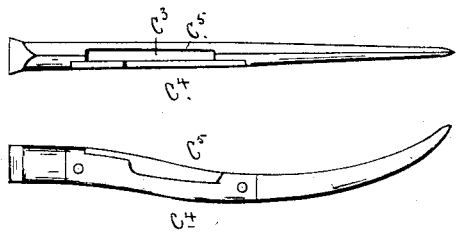
Fig. 6.
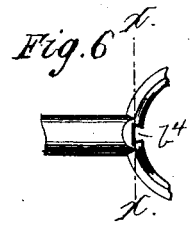
Fig. 8.
Fig. 5.
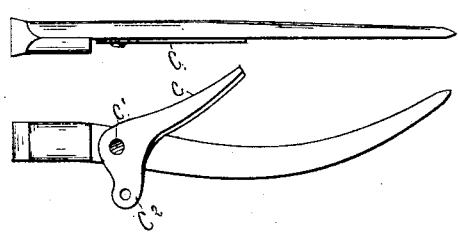
Fig. 7.
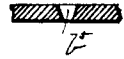
Witnesses:
R. B. Impin
R. W. Bishop.
Inventor
James T. Shoup Jr.
By R. S. & A. P. Lacey
Att'ys

UNITED STATES PATENT OFFICE.

JAMES T. SHOUP, JR., OF DELAWARE, OHIO.

BAND-CUTTER.

SPECIFICATION forming part of Letters Patent No. 284,765, dated September 11, 1883.

Application filed February 2, 1883. (No model.)

*To all whom it may concern:*

Be it known that I, JAMES T. SHOUP, Jr., a citizen of the United States, residing at Delaware, in the county of Delaware and State of Ohio, have invented certain new and useful Improvements in Band-Cutters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in band-cutters.

It consists in the improved band-cutting pitchfork composed of the tines, the knife arranged to be operated at an angle to the plane in which the tines lie, and means for operating the said knife, and in other improvements, as will be hereinafter fully described, and pointed out in the claims.

In the drawings, Figure 1 is a plan view of my fork. Fig. 2 is a side view of the fork with the outer tine broken away, and Fig. 3 shows the handle in section and a side view of the middle tine. Fig. 4 shows, in detail, the tine having vertical slot; and Fig. 5 shows a tine having the knife pivoted to its side. Fig. 6 shows a plan view of the middle portion of the fork with the tine removed. Fig. 7 is a detached sectional view on line $xx$, Fig. 6; and Fig. 8 is an end view of the tine, all of which will be described.

$a$ is the fork-handle. $a'$ is the hand-lever; $a^2$, the rod connecting the hand-lever and knife, and $a^3$ is a spring for operating the hand-lever in its reverse movement, as will be understood on reference to the drawings.

$b$ is the fork, secured on the end of handle $a$, and composed of the tines $b'$ $b^2$ $b^3$. Between the two outer tines, $b^2$ $b^3$, of the fork I form a dovetail mortise, $b^4$, as shown, which might be made tapering from its outer side, and the middle tine, $b'$, is beveled on its inner end, as shown, so that it will fit the mortise $b^4$, for the purpose hereinafter described.

$c$ is the knife, pivoted on pin $c'$, and provided with the extension $c^2$, to which the rod $a^2$ is connected, as shown in Figs. 2 and 3. This knife is pivoted to the side of the tine $b'$, or within a slot, $c^3$, formed in the tine, as shown in Fig. 4. This slot may be cut through the tine, or may be formed by cutting away one side of the tine and riveting a plate, $c^4$, thereto, as shown. I prefer to pivot the knife within the slot, as the tine may thus be made stronger, and the knife can be better secured out of the way when the fork is not to be used as a band-cutter. The side $c^5$ of the tine next the slot $c^3$ is rounded up to a cutting-edge, so that as the knife is worked against the same a scissors action is had. The top plate, $c^4$, is arranged below the top of the side $c^5$, as shown. The upper side of the knife $c$, it will be seen, is curved to correspond with the curve of the tine to which it is pivoted, and the knife is so pivoted that when it is drawn to its top will rest flush with that of the tine, and the curve of the latter will be preserved in an unbroken line.

In handling bundles of grain it is desirable to pick them up so they may be thrown endwise, as thus less surface is presented to the opposition of the air and less labor is required, and they can be thrown with more certainty; also, when the bundle is to be delivered onto the feed-table of a thrashing-machine, it can be spread better when it is held by the fork in the direction of its length. It is to enable this handling of the bundle that I have arranged my knife to cut at an angle to the plane in which the tines lie, as has been described.

In operation the fork is inserted into the bundle so that the tines will be under and the knife over the band, in order that the knife may be operated to cut the band when the bundle is placed at the point desired, or as it is thrown, as will be understood on reference to the drawings.

The operating mechanism shown, consisting of the handle, rod, and spring, is a convenient arrangement; but it will be understood other mechanism could be employed.

By means of the slot $b^4$ and the beveled construction on the end of the middle tine, the said tine may be removed when it is desired to have an ordinary two-tine fork, or where the fork is not to be used as a band-cutter the knife may be held within the slot by locking the hand-lever $a'$ by means of a collar passed over the end of the handle and the lever, or in other suitable manner.

It will be understood that I do not limit myself to the application of my improvement to a three-tined fork or to one of the inner tines, as it might be arranged on one of the outer tines or in connection with a fork of any suitable number of tines.

Having thus described my invention, what I claim, and desire to secure by Letters Patent, is—

1. The combination, with the tined fork and the handle $a$, of the knife $c$, pivoted to one of the tines, and arranged to cut in front of and at an angle to the plane in which the tines of the fork lie, and having its shank $c^2$ projected to the rear of the tines, and mechanism for operating the knife, substantially as set forth.

2. The improved band-cutting pitchfork consisting of the tines, the knife arranged to be operated at an angle to the plane in which the tines lie, and means for operating the said knife, as set forth.

In testimony whereof I affix my signature in presence of two witnesses.

JAMES T. SHOUP, JR.

Witnesses:
B. A. ROLOSON,
JNO. W. H. VOGT.